United States Patent [19]

McGowen et al.

[11] 4,142,743
[45] Mar. 6, 1979

[54] CLAMPING DEVICE

[75] Inventors: Lloyd E. McGowen; Ernest E. Messick, both of West Lebanon, Ind.

[73] Assignee: Tru-Flex Metal Hose Corporation, West Lebanon, Ind.

[21] Appl. No.: 764,372

[22] Filed: Jan. 31, 1977

[51] Int. Cl.² ............................................ F16L 25/00
[52] U.S. Cl. ................................... 285/177; 285/373; 285/424
[58] Field of Search ............... 285/407, 408, 409, 410, 285/373, 419, 424, DIG. 4, 177, 176, 364, 365, 366, 367, 420; 24/279

[56] References Cited

U.S. PATENT DOCUMENTS

| | | | |
|---|---|---|---|
| 1,733,072 | 10/1929 | Pierce | 285/419 X |
| 3,004,781 | 10/1961 | Morris | 285/420 X |
| 3,944,265 | 3/1976 | Hiemstra | 24/279 X |
| 4,049,298 | 9/1977 | Foti | 285/373 X |

Primary Examiner—Dave W. Arola
Attorney, Agent, or Firm—Woodard, Weikart, Emhardt & Naughton

[57] ABSTRACT

An apparatus for axially joining two tubular members of differing diameters in which a band of metal is passed around the adjacent ends of the members and circumferentially stressed by means of reinforcing, notched bars secured to the band, to conform with the outer surfaces of the members. The clamping device may be used to make a strong gas or sound leak-proof joint between two substantially incompressible tubular members in which event the band of metal is substantially stretched plastically so that it conforms intimately with the outer surfaces of the tubular members. The clamping device may also be used to make a joint which is not necessarily gas-leak-proof and is more easily disconnected by not stressing the band of metal to the point where it goes through a substantial amount of plastic yielding. Whichever type of use is made of the clamping device, the notches in the bars cause the bands to conform closely with the outer surfaces of the tubular members throughout a substantial portion of the entire circumference thereof.

1 Claim, 10 Drawing Figures

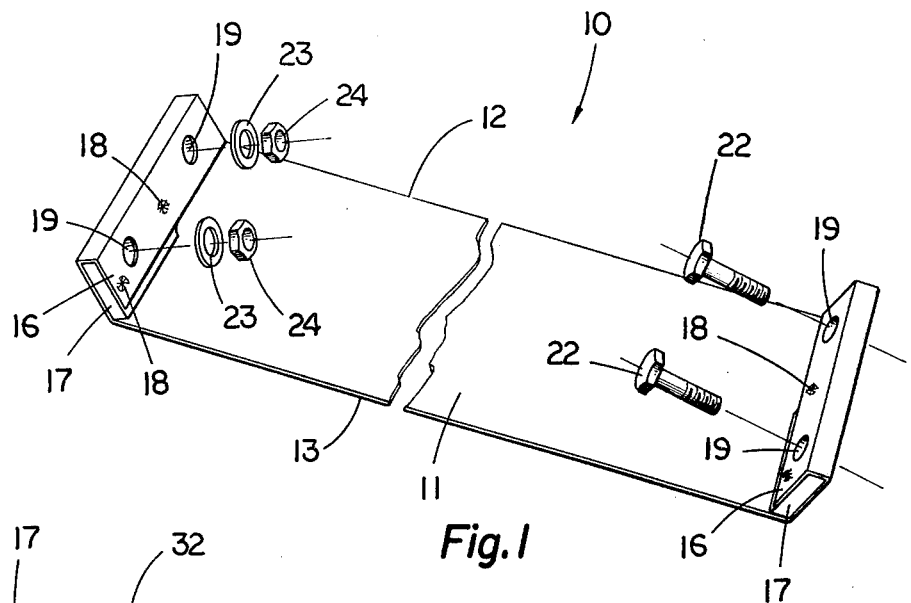
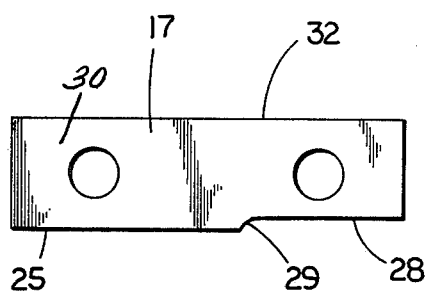
Fig.2
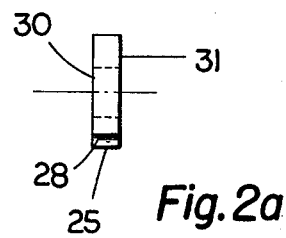
Fig.2a
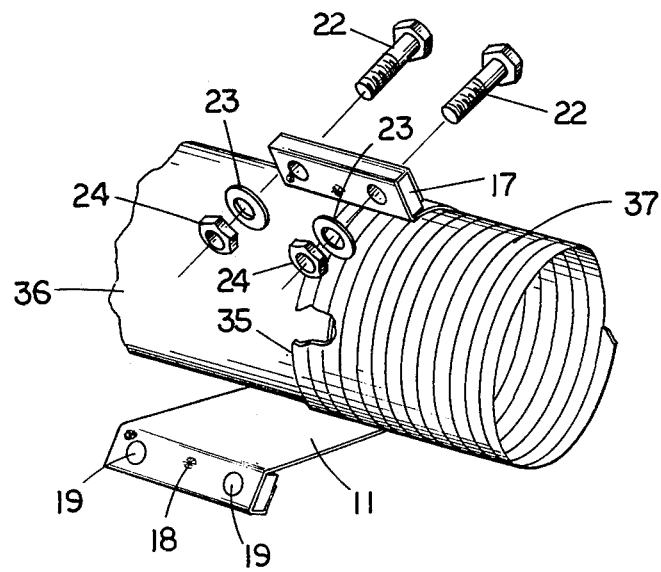
Fig.4
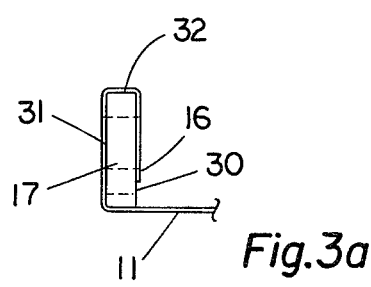
Fig.3a
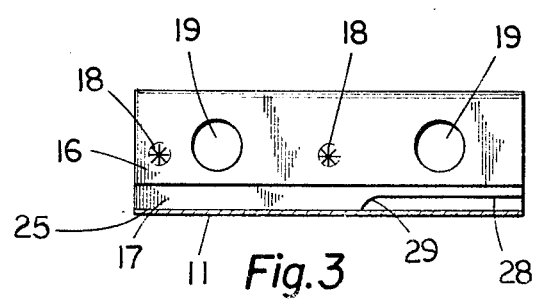
Fig.3

CLAMPING DEVICE

BACKGROUND OF THE INVENTION

1. Field of the Invention

This invention relates in general to the field of connecting or clamping devices and more particularly to a means for joining two tubular conduits of different outside diameters.

2. Description of the Prior Art

There are various prior art situations in which the invention is usable or applicable, such as tubing and hoses of widely varying compositions and sizes, rigid tube and flexible hose combinations, transfer systems in which a solid particle media such as grain or feed is transferred from one point or container to another, and the exhaust systems of trucking equipment. In this latter application, one tubular member may be conventionally inserted into another and secured there by tightening a U-bolt against a semi-circular shoe. This clamping arrangement has the drawback that it deforms the cross sections of the tubes from circular to elliptical, so that stresses are not uniform and so that gas and sound leaks frequently result. A further defect of the arrangement is that the narrow U-bolt frequently dimples the outer tubular member into the inner one, in such a fashion that when the U-bolt is removed, it is impossible to disassemble the complete system without cutting the metal. Again, the U-bolt arrangement is very severe in its action on flexible metal hose, while at the same time being relatively inefficient in preventing leaks along the helical grooves in such hoses. In a grain or feed transfer, where gas and sound leaks are not a factor, this non-uniformity of stresses may still cause premature failure of the connection.

Efforts have been made to overcome the defects of U-bolt type clamps by use of a ductile metal band placed in direct contact with both tubular members and then circumferentially stressed causing the band to conform to the surfaces of the members. To achieve a suitable, gas-tight seal, this method requires that the metal band be stressed beyond its elastic limit.

This ductile band method employs rectangular, reinforced bars secured to the ends of the ductile band with a substantially straight longitudinal edge located toward the axis of the members. When the surfaces of the bars are drawn into mutual flat contact with each other and secured there with a nut and bolt arrangement, the ductile band forms a sealed joint around the tubular members. This method works well with tubular members having the same outside diameter because virtually the entire longitudinal edge of each bar will be drawn into contact with the band and tubular members. This longitudinal contact both reduces stress in the band as well as improves the overall strength of the connection. However, when tubular members of different outside diameters are attempted to be connected, the use of this type of reinforcing bar presents certain disadvantages. As the bars are drawn together into mutual flat contact, the ductile band is stressed to a greater extent around the larger of the two tubular members so that by the time a sealed joint is achieved around the smaller member, the ductile band has been stressed well beyond its elastic limit in the area of the larger member. In addition, the overlap of the joint causes the first end of the bar adjacent the smaller tubular member to have only a single point of contact to the member. Thus, as the bars are drawn together, a line of stress concentration develops at this point and moves from the first end to the opposite end. The end of the bar adjacent the smaller member will not be able to achieve complete longitudinal edge contact against the member, and the result is a connection in which the ductile band is stressed beyond its elastic limit in some areas and has a non-uniform stress pattern in other areas.

The following prior art is known to exist:
U.S. Pat. No. 3,944,265—Hiemstra et al.
U.S. Pat. No. 1,146,813—Peterman et al.
U.S. Pat. No. 1,594,258—Hansen
U.S. Pat. No. 2,227,551—Morris
U.S. Pat. No. 2,314,236—Mott
U.S. Pat. No. 2,713,352—Schustack
U.S. Pat. No. 2,787,051—Risley
U.S. Pat. No. 3,087,221—Armstrong
U.S. Pat. No. 3,216,079—Keyworth
U.S. Pat. No. 3,411,748—Fortune
U.S. Pat. No. 3,708,834—Anderson et al.
U.S. Pat. No. 3,847,419—Brown

SUMMARY OF THE INVENTION

One embodiment of this invention might include a clamping device for connecting two tubular members of different outside diameters with an end of one member adjacent an end of the other. The device includes a band of ductile metal with generally rectangular, rigid members secured thereto, the band being adapted to surround the adjacent ends of the tubular members, and means to circumferentially stress the band thereby drawing it into intimate engagement with the outer surfaces of the tubular members.

The tubular members may be in end-to-end relationship or one member may be telescopically received by the other member. In either case, the two tubular members have different outside diameters. Each rigid member has a notched portion whereby one end of the rigid member is narrower and the opposite end wider. As the ductile band is circumferentially stressed, the rigid members are drawn into mutual flat contact in a plane containing the axes of the tubular members, the narrower end of the rigid member being adjacent the tubular member with the larger outside diameter and the wider end adjacent the tubular member with the smaller outside diameter. One advantage of the invention is that virtually all portions of the ductile band will be equally and uniformly stressed around the two members.

It is an object of the present invention to provide an improved clamping device for the clamping of two, adjacent, tubular members together.

BRIEF DESCRIPTION OF THE DRAWINGS

FIG. 1 is a perspective view of a clamping device according to the present invention prior to use.

FIGS. 2 and 2a are side and end views, respectively, of a notched, reinforcing bar forming a part of the clamping device.

FIGS. 3 and 3a are side and end view details, respectively, of a portion of the structure illustrated in FIG. 1.

FIG. 4 is an exploded perspective view showing how the clamping device is applied to make a joint between two tubular members.

DESCRIPTION OF THE PREFERRED EMBODIMENT

Figure 5:
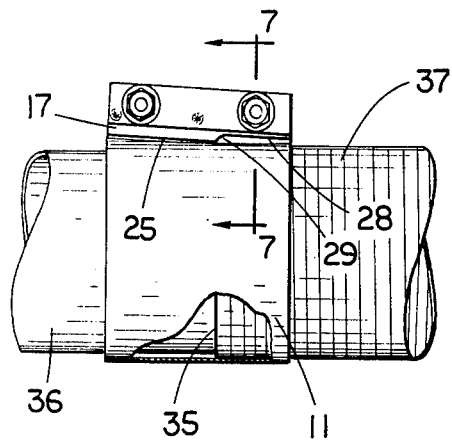
FIG. 5 shows an assembled view of the clamping device and tubular members prior to completely tightening the bolts and nuts.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The embodiment of the present invention shown in the perspective view of FIG. 1 is a clamping device 10 comprising a band 11 of ductile metal having parallel sides 12 and 13. The ends 16 are cut at approximately right angles to the sides 12, 13 giving band 11 a generally rectangular appearance. Each end portion of band 11 is wrapped around a notched, reinforcing bar 17 in such a manner that the bars 17 are approximately parallel to each other and generally perpendicular to sides 12, 13. The band 11 is secured to each bar 17 by spot welds 18 at the wider end of bar 17, one being in the center of the bar and one at the end of the bar. It should be understood that the welds are effected through the bar so that each bar 17 is connected to the band 11 at four points. Spaced bores 19 pass through bars 17 and the ends 16 of band 11 for receiving clamping means shown to comprise a screw or bolt 22 for each bore 19, with cooperating washers 23 and nuts 24.

FIG. 2 shows a side view of the bar 17 of FIG. 1. The bar has a notched portion along one longitudinal end whereby wider end 25 is connected to narrower end 28 by radiused portion 29. Bar 17 may have bores 19 prior to being spot welded to band 11 or bores 19 may be added after spot welding. Ends 25 and 28 form two, offset, planar surfaces which are parallel to the opposite longitudinal edge 32. FIG. 2a is an end view of FIG. 2 showing parallel sides 30 and 31 of bar 17.

FIGS. 3 and 3a are side and end view details, respectively, of band 11 and bar 17 showing the manner in which band 11 is wrapped around bar 17 at end 16 and the positional relationships between the bores 19, spot welds 18, wider end 25, narrower end 28 and radiused portion 29. Band 11 begins at a point slightly spaced from the notched longitudinal edge of bar 17 on side 30 and is wrapped over the opposite longitudinal edge 32, then across side 31 and finally across wider end 25.

Although it is shown in FIGS. 3 and 3a that end 16 of band 11 starts on side 30, the reverse will be true for the opposite end of the clamping device; that is, the end 16 will start on side 31 then wrap around side 30. The reason for this is so that the wider end 25 of each bar 17 will be adjacent side 13 of band 11 (see FIG. 1). Sides 30 and 31 of bar 17 have been identified so that side 30 has wider end 25 on the left side when viewed as in FIGS. 2 and 3.

FIG. 4 shows how a clamping device according to the present invention is applied to a joint 35 between a rigid tube 36 and a flexible metal hose 37. The joint 35 may be formed by either an end-to-end relationship between tube 36 and hose 37 or by the relationship where one member is telescopically received by the other. Band 11 is wrapped around joint 35 of tube 36 and hose 37, one-third to one-half of the width of the band overlying the larger diameter. The ends of band 11 are drawn together and the bars 17 aligned, bolts 22 are passed through bores 19 in both ends, and washers 23 and nuts 24 are loosely applied.

As bolts 22 and nuts 24 are tightened, the bars 17 with band 11 wrapped around are drawn into mutual flat contact. As the tightening occurs, band 11 is stressed and drawn into contact with the outer surfaces of tube 36 and hose 37. The spot welds 18 adjacent the wider end 25 of bar 17 prevent band 11 from pulling away from bar 17. However, band 11 is not spot welded at the narrower end 28 and the band will shift its position by pulling away from bar 17. This shift is minor but it does aid in sealing around the larger tubular member by providing more band material to encircle said member. Further tightening will draw the band into intimate engagement with tube 36 and hose 37 thus forming a sealed connection. The ductile band 11 is of such a composition that it yields plastically before the material of the tubular members. In some applications, however, it is not necessary to stress the ductile band beyond the elastic limit in order to obtain a good connection, particularly where an air-tight or sound-tight seal is not required.

Figure 6:
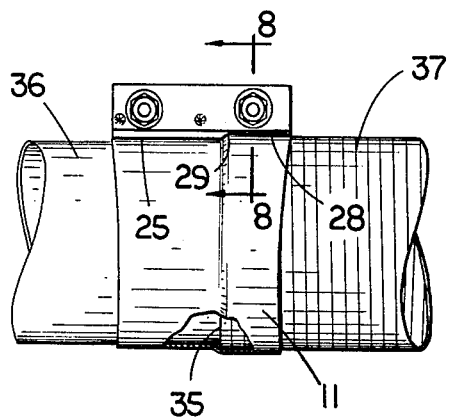
FIG. 6 shows the assembly of FIG. 5 with the bolts and nuts completely tightened.

FIG. 5 shows a side view of the clamp 10, tube 36 and hose 37 arrangement prior to the bolts 22 being tightened. The wider end 25 of bar 17 is adjacent the tubular member with the smaller outside diameter and the narrower end 28 is adjacent the tubular member with the larger outside diameter. Initially, the bar may make only single point contact with each tubular member, but as tightening continues, both ends 25 and 28 of bar 17 will quickly be drawn adjacent the members over their entire notched longitudinal edge, as shown in FIG. 6. The radiused portion 29 is sized to span the diameter difference of the two tubular members at joint 35. The result is a uniformly stressed band drawn into sealing engagement with both tubular members 36, 37 at all points on their outer surfaces. The sealing engagement will be maintained so long as bolts 22 and nuts 24 remain tightened.

Figure 7:
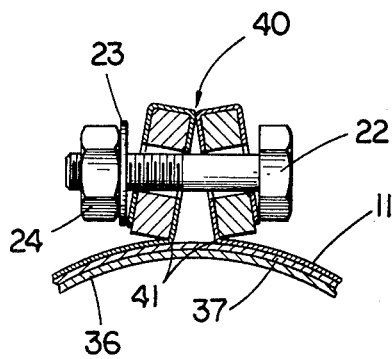
FIG. 7 is a fragmentary sectional view taken along line 7—7 of FIG. 5.

FIG. 7 is a fragmentary sectional view taken along line 7—7 of FIG. 5 showing an initial line of contact 40 of the two bars as they are drawn together. Corner 41 of the notched longitudinal edge is the location of the line of force which draws band 11 into intimate engagement with tubular members 36, 37 as bolts 22 and nuts 24 are tightened.

Figure 8:
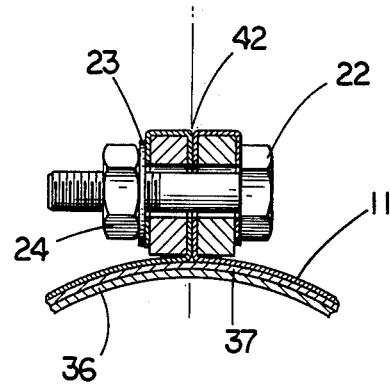
FIG. 8 is a fragmentary sectional view taken along line 8—8 of FIG. 6.

FIG. 8 is a fragmentary sectional view taken along line 8—8 of FIG. 6 showing the final position of the bars 17, band 11, and tubular members 36, 37 after the clamp 10 has been tightened completely. The sides 30 and 31 of the bars 17 are drawn into mutual flat contact with the wrapped band. The surface 42 of contact of the two ends of the band is in a plane containing the axis of each tubular member 36, 37.

The degree of tightening required will depend upon the particular application for the clamping device. In the event tubular members associated with the transfer of rigid or semi-rigid particles are being connected where gas leakage is not a major concern, only nominal tightening force will be necessary to achieve a suitable connection.

Irrespective of the degree of tightening force exerted, the uniformity of application of the forces involved will not produce distortion of the tubular members and has no tendency to cause any dimpling or indentation to interfere with later disassembly of the system for servicing. The radial normal forces acting with the static coefficient of friction is the mechanism by which the tubes are held together by the clamping device. In the case of an exhaust system, these forces prevent the tubes from pulling apart when internal gas pressure is exerted or due to external exhaust system movement. Finally, the connection or clamping device is capable of being applied after the tubular members are joined. With its band arrangement the clamping device of this invention does not have to be positioned around one tubular member before the other member is connected.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a means for connecting a pair of tubular members of different outside diameters;

a band of ductile metal initially of strip form having end portions and bent to cylindrical shape whereby the end portions are adjacent one another, said band surrounding the joint between said members and a substantial portion of the width of said band engaging each of said members in direct contact therewith; and means circumferentially stressing said band and drawing the band into intimate engagement with the outer surfaces of said members, and maintaining said engagement when achieved;

the improvement which comprises said means for circumferentially stressing said band including a pair of notched, rigid, rectangular members secured to said band, each of rigid members being secured to said band at a respective one of said end portions, each of said rigid members having one notched longitudinal edge thereby forming two planar surfaces offset from each other and connected by an intermediate portion, said rectangular members each having another longitudinal edge, the planar surfaces being parallel to the other longitudinal edge, said rectangular member having one narrower end adjacent the tubular member with the larger outside diameter and one wider end adjacent the other tubular member, said rectangular members each having a pair of sides extending between said longitudinal edges, said band being folded around each rectangular member and contacting both longitudinal edges and both sides thereof;

said rectangular members each being secured to a respective end portion of said band by at least a pair of welds, said welds being located on both of said sides at the wider end of each rectangular member so as to provide four welded connections between each rectangular member and said band;

said rectangular members being disconnected from said band at the narrower end of said rectangular members.

* * * * *